Oct. 30, 1934.　　　　J. BITTNER　　　　1,978,666
BRAKE
Filed Sept. 15, 1928

INVENTOR.
John Bittner
BY
ATTORNEY.

Patented Oct. 30, 1934

1,978,666

UNITED STATES PATENT OFFICE 1,978,666

BRAKE

John Bittner, South Bend, Ind., assignor to Bendix Brake Company, South Bend, Ind., a corporation of Illinois Application September 15, 1928, Serial No. 306,185

10 Claims. (Cl. 188—152)

This invention relates to brakes, and is illustrated as embodied in an internal expanding brake for an automobile. An object of the invention is to provide a simple and powerful brake, preferably adapted for operation by novel hydraulic or other fluid-power means.

In one desirable arrangement, a brake shoe is arranged to be forced against the drum by the novel fluid-power means, preferably including an expansible bellows which has sufficient resilience to permit a slight shifting of the shoe lengthwise. This shoe is illustrated as having a servo action in applying the main friction means, which may be of the type anchoring on one part when the drum is turning in one direction and on another part when the drum is turning in the other direction. I prefer to have this friction means in the form of articulated shoes with their anchorages at their unarticulated ends, and in order to secure a compact structure the servo shoe may overlap these ends.

Figure 1:
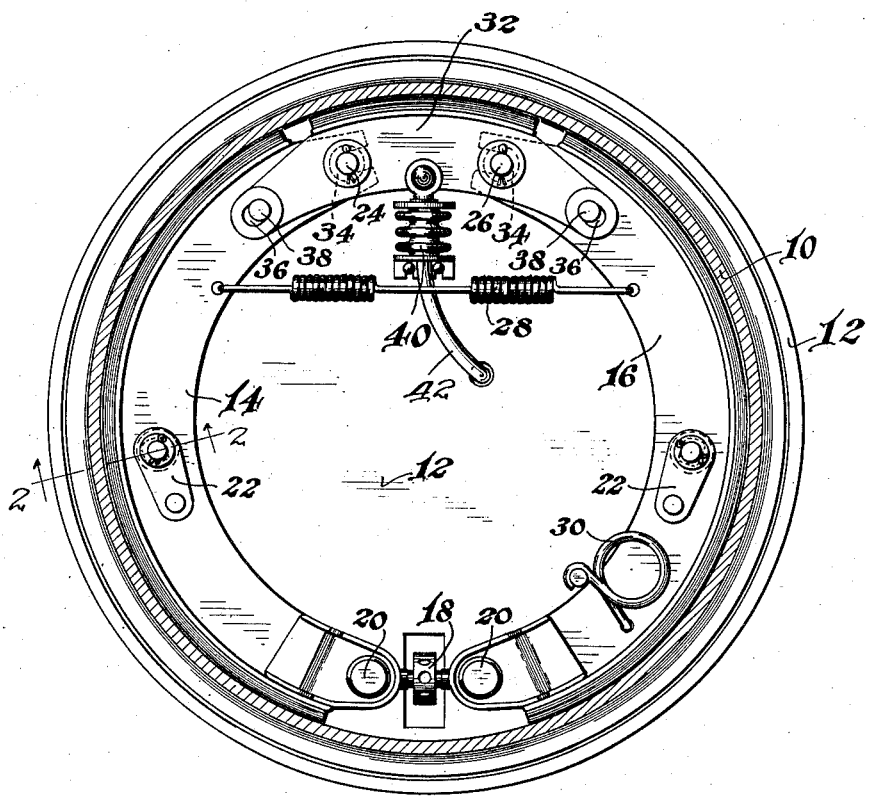
Figure 2:
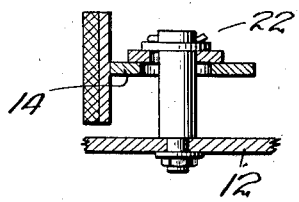

The above and other objects and features of the invention, including various novel and desirable details of construction, will be apparent from the following description of one illustrative embodiment shown in the accompanying drawing, in which:

Figure 1 is a vertical section through the brake, just inside the head of the brake drum, and showing the brake shoes in side elevation; and Figure 2 is a view in section taken substantially on the line 2—2 of Figure 1.

The illustrated brake includes a rotatable drum 10, at the open side of which is a support such as a backing plate 12, and within which is arranged the friction means of the brake. The friction means shown includes two shoes 14 and 16 adjustably connected by an articulation or joint such as a right-and-left threaded member 18 threaded into transverse pivots 20 in the shoe ends. The idle positions of shoes 14 and 16 are determined by suitable stops 22 which in themselves form no part of my invention.

Shoes 14 and 16 may be notched or otherwise formed at their ends to engage fixed anchors or pivots 24 and 26 carried by backing plate 12, the friction means anchoring on pivot 24 when the drum is turning clockwise and on pivot 26 when the drum is turning counterclockwise. The brake is applied against the resistance of a coil return spring 28 tensioned between the shoes, and an auxiliary torsion return spring 30 acting on shoe 16 and urging it toward an idle position determined by its stop 22.

The servo shoe, which is shown at 32, has spaced webs straddling and overlapping the anchored ends of shoes 14 and 16, and formed with relatively large openings 34 for the passage of anchors 24 and 26. This shoe is shown with slots 36 at its ends, embracing transverse thrust pivots 38 carried by shoes 14 and 16.

The servo shoe is operated by novel fluid-power means such as an expansible metallic bellows 40 secured to plate 12, and which is connected to the center of the shoe and which acts radially outward. Fluid under pressure is supplied to bellows 40 by means of a conduit 42. This bellows has sufficient resilience to permit the shoe to shift slightly lengthwise, and thus has three major functions: (1) it forces the shoe against the drum; (2) it acts as a return spring to withdraw the shoe from the drum; and (3) it serves as centering means to return the shoe to its normal idle centered position.

While one illustrative embodiment has been described in detail, it is not my intention to limit the scope of the invention to that particular embodiment, or otherwise than by the terms of the appended claims.

I claim:

1. A brake comprising, in combination, friction means having spaced apart ends, a servo shoe positioned intermediate said ends, said shoe shiftable lengthwise and operating the friction means, and fluid-power means secured at one end against movement of rotation and thrusting outwardly on the servo shoe between its ends to apply the brake, without substantially restricting the lengthwise shifting of said shoe, said means being connected directly to said shoe intermediate its ends.

2. A brake comprising, in combination, a drum, a friction device anchoring at one end when the drum is turning in one direction and anchoring at the other end when the drum is turning in the other direction, a servo shoe overlapping said ends of the friction device and arranged to operate the friction device, and fluid-power means secured at one end against movement of rotation for forcing the servo shoe against the drum without interfering with its action in operating the friction device and without interfering with the shifting of the anchorage.

3. A brake comprising, in combination, a drum, a friction device anchoring at one end when the drum is turning in one direction and anchoring at the other end when the drum is turning in the other direction, a servo shoe overlapping said ends of the friction device and arranged to operate the friction device, and a fluid-operated expansible bellows directly connected to said servo shoe at one end secured at the opposite end against movement of rotation.

4. A brake comprising a lengthwise movable shoe, a backing plate, and a resilient applying device secured at one end against movement of rotation to the backing plate and acting on the shoe and distorted transversely by lengthwise movement of the shoe in one direction whereby the shoe upon release of the brake is moved lengthwise in the reverse direction.

5. A brake comprising, in combination, a drum, anchor members, a friction device anchoring on one part when the drum is turning in one direction and anchoring on a different part when the drum is turning in the other direction, a servo shoe engageable with the same zone of the drum as the friction device and arranged to operate the friction device, the aforementioned anchor members lying intermediate the length of the servo shoe, together with fluid power means for forcing the servo shoe against the drum without interfering with its action operating the friction device and without interfering with the shifting of the anchorage.

6. A brake comprising, in combination, a drum, anchor members, a friction device selectively anchoring on one or the other of said members depending on the direction of drum rotation, a servo shoe arranged to operate said friction device, said anchor members positioned intermediate the length of said shoe, together with a fluid power means for forcing the servo shoe against the drum, said means being directly connected to said shoe intermediate said anchor members.

7. A brake comprising, in combination, a rotatable drum, spaced anchor pin members, a floating friction device within said drum adapted to anchor on one or the other of said anchor pins at the ends of said device, a pin projecting from the side of said device at each end thereof, a floating servo shoe straddling the ends of said friction device, said shoe slotted at its ends to accommodate said last mentioned pins and to permit the selective anchoring of the friction device, together with means intermediate said anchors for actuating said servo shoe.

8. A brake comprising in combination, a brake drum, a backing plate for said drum, friction means associated with said drum and having spaced apart ends, a servo shoe positioned intermediate said ends and shiftable lengthwise for operating the friction means, and fluid power means rigidly mounted upon said backing plate and connected to said servo shoe between its ends for thrusting outwardly on said servo shoe to apply the brake without substantially restricting the lengthwise shifting of said shoe.

9. A brake comprising in combination, a brake drum, a backing plate therefor, friction means associated with said drum and having spaced apart ends, a servo shoe positioned intermediate and connected to both said ends, said shoe being shiftable lengthwise and operating the friction means, and a fluid pressure motor pivotally connected at one end to said servo shoe and rigidly mounted at the other end upon said backing plate.

10. A brake comprising in combination, a brake drum, a backing plate for said drum, friction means associated with said drum comprising a pair of main braking shoes and a servo shoe, and fluid power means rigidly mounted upon said backing plate and acting radially of the drum upon said servo shoe.

JOHN BITTNER.